United States Patent
Relan et al.

(10) Patent No.: US 8,213,774 B2
(45) Date of Patent: Jul. 3, 2012

(54) SPOTLIGHT EFFECT IN VIDEO PROCESSING AND PLAYBACK

(75) Inventors: Sandeep Kumar Relan, Bangalore (IN); Brajabandhu Mishra, Orissa (IN); Rajendra Kumar Khare, Bangalore (IN)

(73) Assignee: Broadcom Corporation, Irvine, CA (US)

(*) Notice: Subject to any disclaimer, the term of this patent is extended or adjusted under 35 U.S.C. 154(b) by 1761 days.

(21) Appl. No.: 11/410,144

(22) Filed: Apr. 25, 2006

(65) Prior Publication Data

US 2007/0121011 A1 May 31, 2007

Related U.S. Application Data

(60) Provisional application No. 60/740,653, filed on Nov. 30, 2005.

(51) Int. Cl.
 *G11B 27/00* (2006.01)
 *H04N 5/93* (2006.01)
(52) U.S. Cl. .......... 386/280; 348/571; 348/576
(58) Field of Classification Search .......... 386/46, 386/280; 348/571, 576
 See application file for complete search history.

(56) References Cited

U.S. PATENT DOCUMENTS

| | | | | |
|---|---|---|---|---|
| 5,610,653 A * | 3/1997 | Abecassis | ........ | 348/170 |
| 5,805,782 A * | 9/1998 | Foran | ........ | 345/426 |
| 6,020,931 A * | 2/2000 | Bilbrey et al. | ........ | 348/584 |
| 2004/0001079 A1* | 1/2004 | Zhao et al. | ........ | 345/719 |
| 2004/0264568 A1* | 12/2004 | Florencio | ........ | 375/240.12 |
| 2006/0044389 A1* | 3/2006 | Chai et al. | ........ | 348/143 |
| 2006/0227997 A1* | 10/2006 | Au et al. | ........ | 382/103 |
| 2008/0215468 A1* | 9/2008 | Monsa-Chermon et al. | ... | 705/34 |

* cited by examiner

*Primary Examiner* — Thai Tran
*Assistant Examiner* — Girumsew Wendmagegn
(74) *Attorney, Agent, or Firm* — Thomas, Kayden, Horstemeyer & Risley LLP.

(57) ABSTRACT

Spotlighting and other special effects are applied by processing circuitry in real time to received video streams. Effects tracking may be applied to fixed regions or moving regions or objects of interest. Viewers interact via conventional remote controls and other user interfaces to set effect parameters. Other special effects employed include zooming, masking, etc. and can be used to enhance one or more spotlight effects. Televisions, set top boxes and media players house the underlying circuitry. Effects are applied to layered and non-layered video streams to form layered and combined video stream output. Video outputs also deliver effect parameters such as region of interest location along with a video stream. Such effect parameters assist in the downstream application of dynamic effects.

35 Claims, 11 Drawing Sheets

|   |   |   |
|---|---|---|
| 1 | 03220610 | 03220714 |
| 1 | 03220714 | 03221830 |
| 2 | 03221830 | 03222130 |
| 3 | 03222130 | 03230615 |
| ⋮ | ⋮ | ⋮ |
| 2 | 03231800 | 03231830 |

FIGURE 11 ary embodiment of the present invention;

SPOTLIGHT EFFECT IN VIDEO PROCESSING AND PLAYBACK

CROSS-REFERENCE TO RELATED APPLICATIONS

This application claims priority of U.S. Provisional Patent Application No. 60/740,653, filed on Nov. 30, 2005. The subject matter of this earlier filed application is hereby incorporated by reference.

BACKGROUND OF THE INVENTION

1. Technical Field

This invention relates generally to video communication systems with special effects, and more particularly to the application of special effects in video processing and playback of video streams delivered via communication systems.

2. Description of the Related Art

Manually operated spotlights ("manual spotlighting") are used widely in shooting movies, theaters, drama plays, ballet programs, or other live performance situations. Manual spotlighting requires a high degree of precision and timing by the operators applying the effects. Typically, many highly skilled operators work together to apply manual spotlighting for accuracy and maximum effect. Using a laser light pen, spotlight effect is also applied manually during presentations to focus the attention of participants.

The main limitations in these manual applications of spotlight effects are occasional errors of application in terms of precision as well as timing, operator fatigue, requirement of many skilled operators and incapacity to apply dimming or differential intensity effects within the spotlight region of interest.

During post processing of a previously captured video, effects such as spotlighting may be applied via computers using editing software designed for that purpose. This post processing is rather tedious, time consuming and requires a skilled operator. Only after completing the manual editing of the video to apply such special effects can the edited video be delivered for viewing.

Video programming on a television (TV) requires video equipment that broadcasts video streams or video content to users. Often, there is a lot of action captured in the video that is broadcast, and a user may have trouble following the actions. Sometimes, a user misses the main activity due to other video movements that might be distracting to a user.

For example, in a live sporting event broadcast, a number of players are shown interacting with a ball. Often, it is difficult to follow the movements of individual players or the ball. This problem is so significant that many television viewers that have personal video recorders record the game so that movements can be replayed, frozen or slowly played back. Unfortunately however, while the viewer is replaying or freezing movement, the sporting event continues and more current movements are missed.

Further limitations and disadvantages of conventional and traditional systems will become apparent to one of ordinary skill in the art through comparison of such systems with the present invention described herein.

BRIEF DESCRIPTION OF THE DRAWINGS

FIG. 11 illustrates a usage log according to an exemplary embodiment of the present invention.

DETAILED DESCRIPTION OF THE PREFERRED EMBODIMENTS

The present invention relates generally to creation and display of video data such that at least a portion of the video, such as one of the regions of interest (ROI) appears highlighted or enhanced by means of a spotlight or by other contrast differentiation techniques known in the art. A ROI is part of a scene that needs to be highlighted, for example, the face of an important actor among a group of actors.

Figure 1:
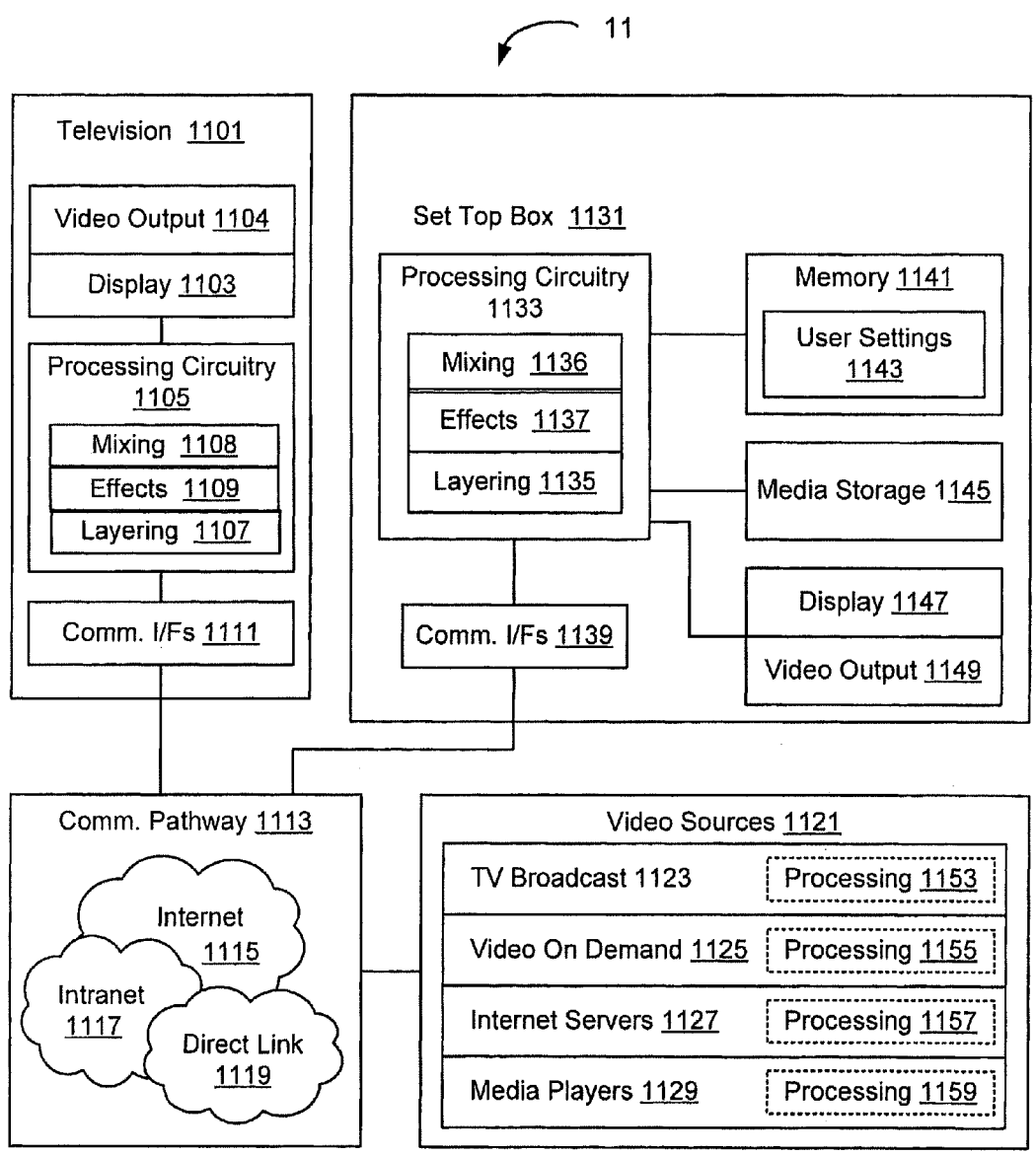
FIG. 1 is a schematic block diagram of a video effect creation system built in accordance with the present invention.

FIG. 1 is a schematic block diagram of a video effects creation system in accordance with an exemplary embodiment of the present invention. The video effects creation system 11 is incorporated in a Television (TV) 1101 and a set top box 1131, where video layers are separated from a non-layered video and where special effects, which include but are not limited to, spotlight effects, zoom effects, etc. are applied as per user's choice. These effects work on various video sources 1121 such as a TV broadcast source 1123, video on demand source 1125, Internet servers 1127, media players 1129, etc. after suitable processing by processors 1153, 1155, 1157 and 1159.

The video from the video sources 1121 is fed through a communication pathway 1113. The communication pathway 1113 includes Internet 1115, Intranet 1117 and direct links 1119. The communication pathway 1113 in turn feeds a communication interface 1111 in the TV 1101 or a communication interface 1139 in the set top box 1131, so that video effects may be applied. In the TV 1101, if the received video is non-layered, the video is separated into layers by a layering module 1107 and then the effects are applied by an effects module 1109. The layering module 1107 and effects module 1109 are functional modules housed in the processing circuitry 1105. Various effects are mixed using a mixer 1108 for final display 1103 and output 1104. Layered video offers more flexibility than non-layered video while applying the special effects. For instance, if a user does not wish to display one of the persons or objects in a layered video, the user need only switch off that layer containing the particular person or object.

In the TV 1101, the video with processed effects (hereinafter "Processed Video") is displayed on the display 1103 as well as transmitted to a video output via broadcast or a cable for user viewing with or without special effects as per user choice. Similarly, in the set top box 1131, a layering module 1135 and effects module 1137 comprise the named functionality performed by processing circuitry 1133. The set top box 1131 also contains both a memory unit 1141 that stores user settings 1143 relating to the special effects, and a media storage 1145 for storing the Processed Video. Various effects are mixed using a mixer 1136 for final display 1147 and output 1149. The Processed Video is locally displayed on the display 1147 as well as transmitted to a video output for user viewing.

Exemplary user interactions are basically between the Television 1101 and in the Set Top Box 1131. Video sources 1121, whether layered or non layered, are input into the Communication interfaces 1111 in the case of the Television 1101 and the Communication interfaces 1139 in the case of the Set Top Box 1131 via Direct Link 1119 or Internet 1115 or Intranet 1117 in the Communication Pathway 1113 depending upon the type of Video Sources 1121. In the case of TV Broadcast 1123, Video On demand 1125 and Media Players 1129, is accomplished via Direct Link 1119. On the other hand, for a video source obtained through Internet Servers 1127, it is via Internet 1115 or Intranet 1117.

One or more of the special effects such as the spotlight effect can be applied to Video from a single layer TV broadcast channel 1123 by converting the single layer into multi-layers using the Layering module 1107 or 1135. The user selects the number of layers to be separated from the single layer video input and assigns a unique layer number for each of the separated layers. The user also selects the types of special effects such as the spotlight effect, the zoom effect, etc. to be applied on the layers of user's choice. The invention can also facilitate the input of multi-layered auxiliary video source 1121 derived from Media Players 1129, Internet Servers 1127 or Video On Demand 1125, in addition to a non-layered (or single layered) TV Broadcast 1123. Thus, a number of video layers are created in the invention, which can be selectively invoked by the user to bring about a number of special effects in addition to the spotlight and zoom effects.

In accordance with another embodiment of the invention, several effects can be applied in parallel. For example, in a long shot, an action hero's face in a scene can be spotlighted, simultaneously zooming in on him. In addition, a different background scene from the original scene, can be viewed, from another auxiliary video source, say, a media player 1129. This is accomplished by separating the actor and the original background scene into two different layers, say, layer 1 (actor, top most layer) and layer 2 and, with a tracking spotlight in layer 3 using the layering modules 1107 or 1135. The new background scene from the auxiliary video source is assigned a separate layer, for example, layer 4. The zoom in effect is directly applied on layer 1, with spotlight automatically tracking the actor's face. The user interactively assigns and selects all the layers, spotlight area/size/color, what layers to be mixed, etc. to produce the desired special effects. In Set Top Box 1131, User Settings unit 1143 is utilized for this purpose. If the original background is desired, then the layers 1, 2 and 3 are mixed using a Mixing module 1108 or 1136 to produce a single layer video output, incorporating the spotlight and the zoom in effects. On the other hand, if the new background scene is desired instead of the original background, then the layers 1, 3 and 4 are mixed.

A user can interact to select a pre-layered video from a media player or a game unit, for example and, send the processed effects as described before directly to the television for display and transmission, wherein the layering module is not needed. In this embodiment, the non-layered TV Broadcast 1123 video source is not used. This feature is equally applicable in the case of Set Top Box 1131 as well.

The layering and effect processing can take place at both the Television 1101 and Set Top Box 1131 at the same time with each applying different effects before each produces a single layer output. For example, the Television 1101 can apply a moving spotlight on a scene, whereas the Set Top Box 1131 can apply a zoom in or out effect as appropriate on the same scene.

In another embodiment, the TV 1101 accepts layered video. In this case, only the Set Top Box 1131 performs the layering and the TV 1101 produces the single layer output, while both can apply effects. The Set Top Box 1131 accepts either layered or non-layered video and need not invoke layering.

A single or multiple remote controls can be used by the user(s) to set up or disable special effects described earlier on either the TV 1101 or the Set Top Box 1131 or both.

The layering circuitry might be found in the Set Top Box 1131 and only effects processing might be placed in the Television 1101 with a layered video being sent from the Set Top Box 1131 to the Television 1101.

The Video Sources 1121 may also include the layering and effects processing circuitry, in which case, the Set Top Box 1131 and Television 1101 could apply or not apply the effects produced and broadcast from the Video Sources 1121, and could each apply different or additional effects. The layering and effects processing circuitry could also be stored in other Video Sources 1121 such as Media Players 1129, Video On Demand 1125, etc.

The TV broadcasting source 1123 can be multi-channel sources such as cable, fiber, internet server, satellite or single source such as TV broadcast. Appropriate signal conditionings are incorporated in Communication Pathway 1113 to make these variegated signals compatible with Television 1101 and Set Top Box 1131.

Video on demand source 1125 can be cable service provider servers delivered via cable pathways, fiber service provider servers via fiber, satellite service providers or internet servers via any internet pathway. As in the case of TV broadcasting source 1123, signal conditionings are incorporated in Communication Pathway 1113 to make the Video on demand source 1125 signals compatible with Television 1101 and Set Top Box 1131.

Exemplary media players 1129 can be any of the following: digital video disk (DVD), video compact disk (CD), video recorder/player, game unit, etc.

The communication pathway 1113 comprises one or both of wireless and wired communication elements which include but are not limited to wireless IEEE 802.11, Bluetooth, IEEE 802.16, cellular, Infrared Data Association (IRDA) communications and ultra-wideband standard communications and fiber, cable, USB port, Ethernet, Firewire types of standard communications with appropriate signal conditionings.

Basic details of converting a non-layered video to a layered video are as follows. Common TV broadcast is an example of a non-layered video or one may regard it as a single video layer. A scene comprises a number of objects and/or persons, which are integral whole and cannot be separated normally.

However, these objects/persons and the remaining background can be separated by applying object segmentation circuit modules that operate on mathematical morphology such as morphing, region merging, etc. These separated objects are treated as separate layers and stored in different memories for further processing such as applying special effects, mixing etc. as discussed earlier.

The special effects that can be applied by the effects module 1109 or 1137 include spotlight, zoom in/out, wipe scene change, multiple scene display; titles: fade in/out, smooth moving up titles, etc.

Figure 2:
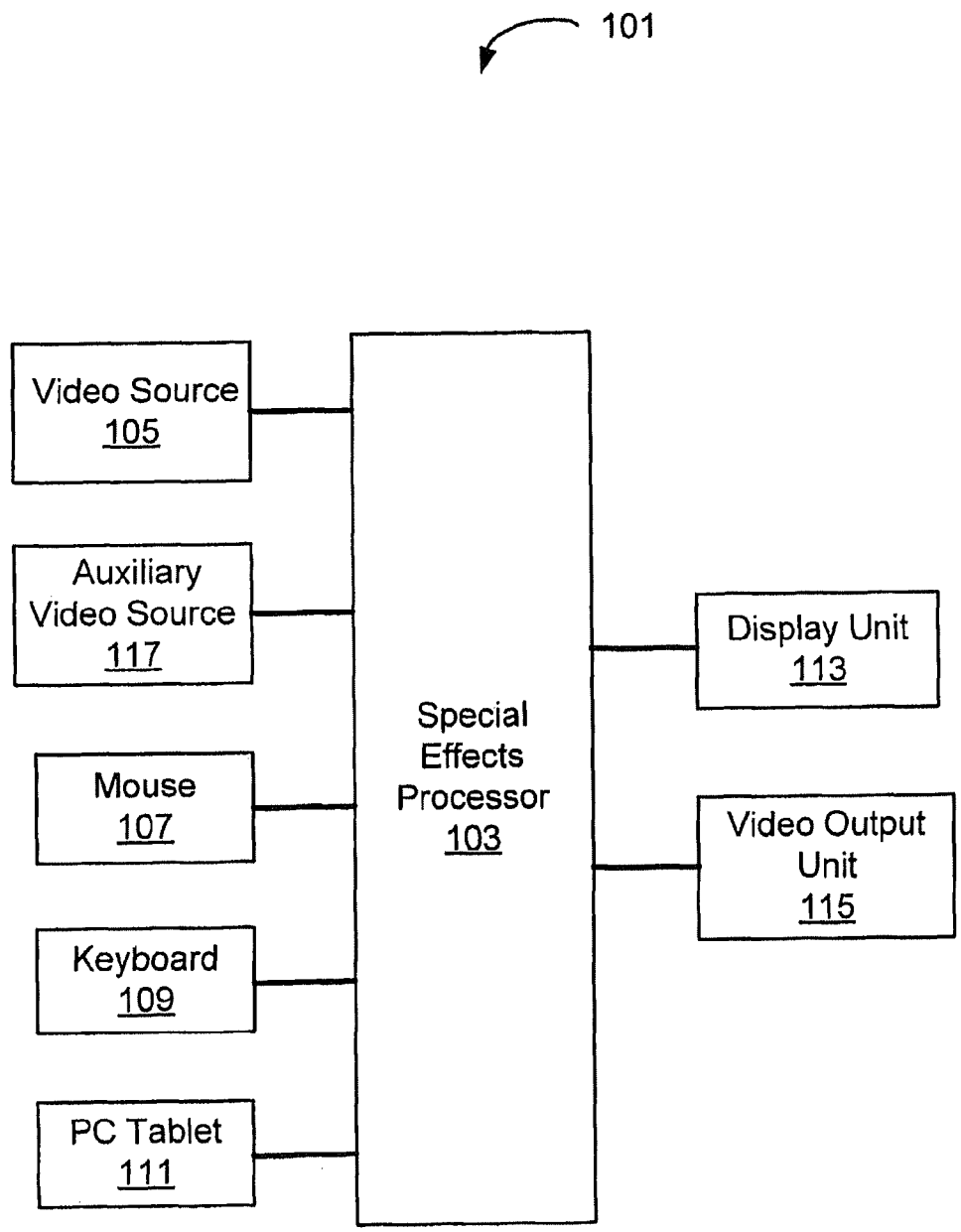
FIG. 2 is a schematic block diagram of a video effects creation system in accordance to an exemplary embodiment of the present invention.

FIG. 2 is a schematic block diagram of a video effects creation system 101 that applies special effects to single layered video based on user parameter settings built in accordance with the present invention. The video effects creation system 101 facilitates the creation of a video with special effects, such as a spotlight effect, for a video data provided by a video source 105, the layered output provided by a video output unit 115 with special effects incorporated into the processed video data. The video effects creation system 101 includes the video source 105 which receives a non-layered video or a single layer video, an auxiliary video source 117 that locally supplies video sequence in separate video layers, a special effects processor 103 that generates spotlight effects, etc., and a display unit 113 for displaying the processed video or independent layer(s) as per user's selection. User provides the specification of spotlight effects, etc. using wired or wireless mouse 107, a keyboard 109, and a PC tablet 111 as shown in FIG. 2.

Just as in a theatre, where there is often a need to spotlight one or more of the characters during a live drama on stage, there is often a need in television programs and live TV broadcasts to enhance the visual experience, by the use of spotlights. Such spotlights, generated by the special effects processor 103, make it possible to enhance the visual appeal of a part of a scene or one or more of the characters in contrast to other characters.

Hitherto, spotlights were implemented by software and therefore, slow and could not be applied extempore in real time. In contrast, the invention is dynamic and offers real time processing. The present invention includes features such as specified spotlights that can be brightened or dimmed or kept as it is. Another feature is a reverse spotlight, i.e., highlight other areas more than the spotlighted areas. Spotlights are non-tracking or tracking types and, can be applied off-line or on-line and so on. All these special effects as well as layer selections illustrated in the following paragraphs are set by the user using various standard input devices such as wired or wireless Mouse 107, Keyboard 109 and PC Tablet 111.

Each of the objects and the background scene separated from a non-layered video source 105 are assigned the first few layers starting from layer 1. Further, auxiliary video source 117 supplies video sequence in separate video layer(s), which can be used as a new background instead of the background scene separated from a non-layered video source 105. Similarly, each of the spotlights is applied in an independent video layer.

As an example, if three actors are walking down a street in New York with high rise buildings in the background, the separated layers can be layer 1 to layer 3, one layer for each of the three actors and, layer 4 for the background, namely, the buildings. Let us also assume that layer 5 is a video sequence of snow capped Titlis received from the auxiliary video source 117, which scene was shot from a camera moving in an approximately the same direction as the camera used to capture the three actors in New York. Let us say that we wish to apply a tracking circular spotlight for each of the three actors' faces, each spotlight in a different color. These spotlights shall be in three different layers, layer 6 (corresponding to the first actor captured in layer 1, and so on) to layer 8. Layer 1 masks (confined to the area occupied by the object in this layer), i.e., blocks other layers except spotlight layers. Layer 2 masks all layers except spotlight layers and layer 1 and, so on.

Each layer can be switched on or off at will or layer numbers changed by the user using the input devices mentioned earlier. A number of effects are created by combining different video layers in the above example. For example if exactly the same New York scene with the three actors is needed, then the user may just switch on layers 1 through 4, with other layers off, combine the four layers to display the combined video. For another effect, if layers 1 and layer 5 are turned on and combined, displayed is the first actor alone with Titlis as the background. For implementing spotlight effects, all layers except layer 4 are turned on, in which case all the three actors' faces are spotlighted with Titlis as the background. Respective spotlights follow the movements of the actors since the programmed spotlights are of tracking type. The background can also be switched on to New York, instead of Titlis. Similarly, many other combinations of effects such as zoom effect etc., are also possible for the above example. The spotlight and other effects can be turned on or off at any time by user interaction. The processed video with special effects (or without them if user chooses it that way) is displayed using the Display Unit 113 and also transmitted at the Video Output Unit 115, which is normally broadcast by Television 1101.

Figure 3:
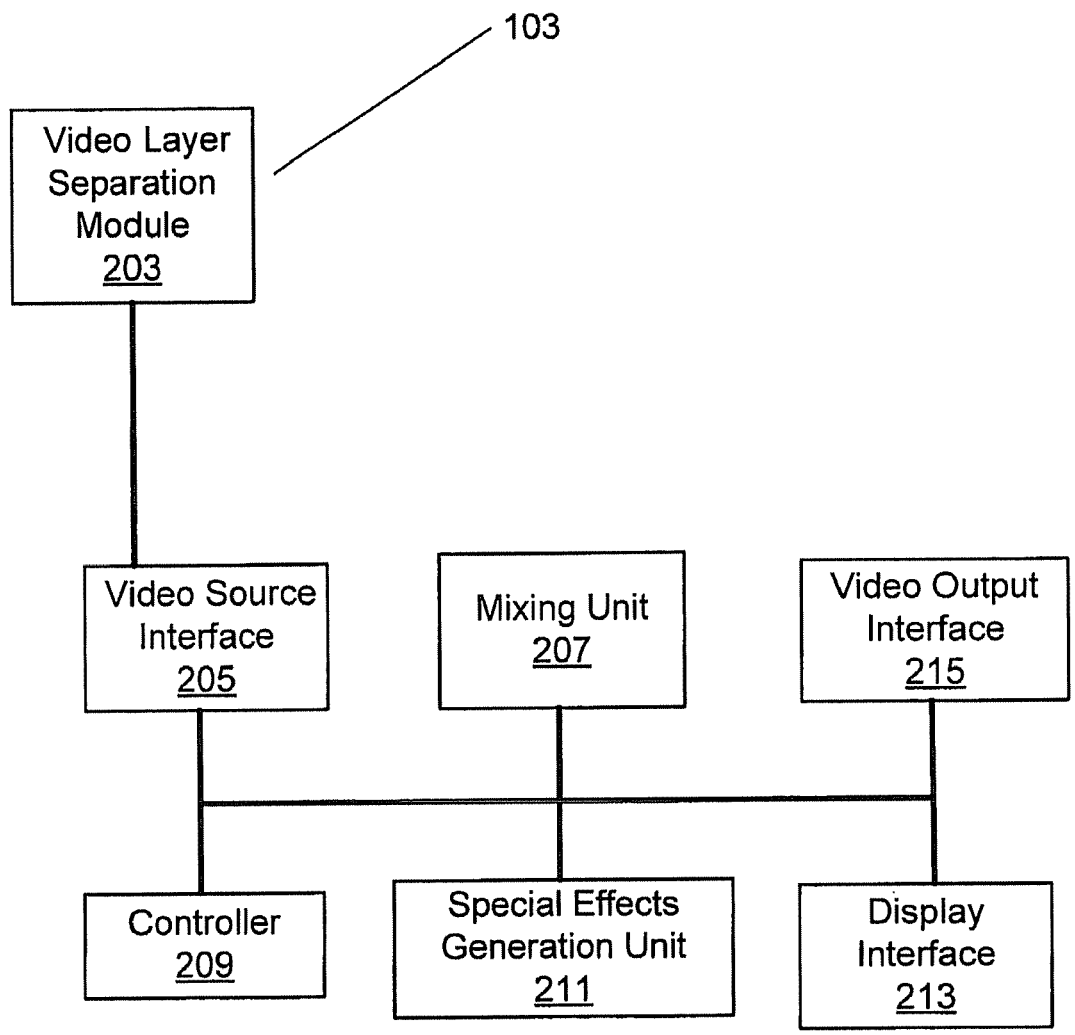
FIG. 3 is a block diagram of a special effects processor in accordance to an exemplary embodiment of the present invention.

FIG. 3 is a block diagram of a special effects processor 103 that creates a video with special effects, such as a spotlight effect, for a video data provided by video sources in accordance with an exemplary embodiment of the present invention. The special effects processor 103 is shown in greater detail in FIG. 3. The effects processor 103 includes a video source interface circuit 205 connected to the video layer separation unit 203 and an auxiliary video source 117. A non-layered, i.e., a single layer video source 105 is input to the video layer separation unit 203, which separates objects into layers. The effects processor 103 also includes a controller 209 that provides video editing and special effect generation controls, a special effects generation unit 211 that generates spotlight effects, etc., a mixing unit 207 that mixes the video inputs from the video source 105, an auxiliary video source 117 and special effects such as the spotlight effect. A display interface 213 is connected to a display unit 113 and a video output interface 215 is connected to a video output unit 115, which is used to transmit the processed video in layers. A user provides the required specifications of spotlight effects, zoom effects, etc., to the controller 209 using a mouse 107, a keyboard 109 and a PC tablet 111. Since various video inputs such as a mouse and a video source, and outputs such as display units have different signal requirements; they need to be signal conditioned before they can be effectively interconnected. Their respective interface circuits mentioned earlier meets these requirements.

The special effects generation unit 211 is capable of not only creating different kinds of spotlight effects, but also provides for other special effects such as zooming effects, that enhance the spotlight effect. Zooming effects can be either a zoom-in or zoom-out effect. For example, if a scene has a number of persons and, we wish to show a person in close view, the zoom-in effect is applied. To this, the tracking spotlight as well can be applied, for example, to the face of this particular person. Similarly, a person to start with and zoom-out revealing other persons and background scene, with the person's face spotlighted can be displayed. An existing video picture provided by the video source 105 can be enhanced by the introduction of a spotlight. In general, a spotlight affects only a part of the picture or video being enhanced. A spotlight can be at least one of a circle, a square, a star or any other geometrical shape in various colors such as green, red, blue, etc. Such a spotlight is effective in catching the attention of users.

In one embodiment of the invention, the spotlight effect is introduced by highlighting a certain region of interest. A ROI can be a part of a scene such as a rectangle, a circle, a star etc. and, of size specified by the user using inputs such as a mouse 107, a keyboard 109, and a PC tablet 111 via a wired or wireless link. Highlighting can occur by manipulating a background light, a foreground light, an illumination level, a color level, etc., that is manipulated by the special effects generation unit 211.

In another embodiment of the invention, the special effects generation unit 211 introduces a spotlight effect by reducing the light in a region of interest identified using the controller 209 and inputs like a mouse 107. The spotlight effect is created by enhancing a relative distinction between a selected region of interest and other regions that may be termed as regions of disinterest. That is, the spotlight effect is created by reducing or increasing the background light, foreground light, illumination, color, etc. or a combination of these.

Figure 4:
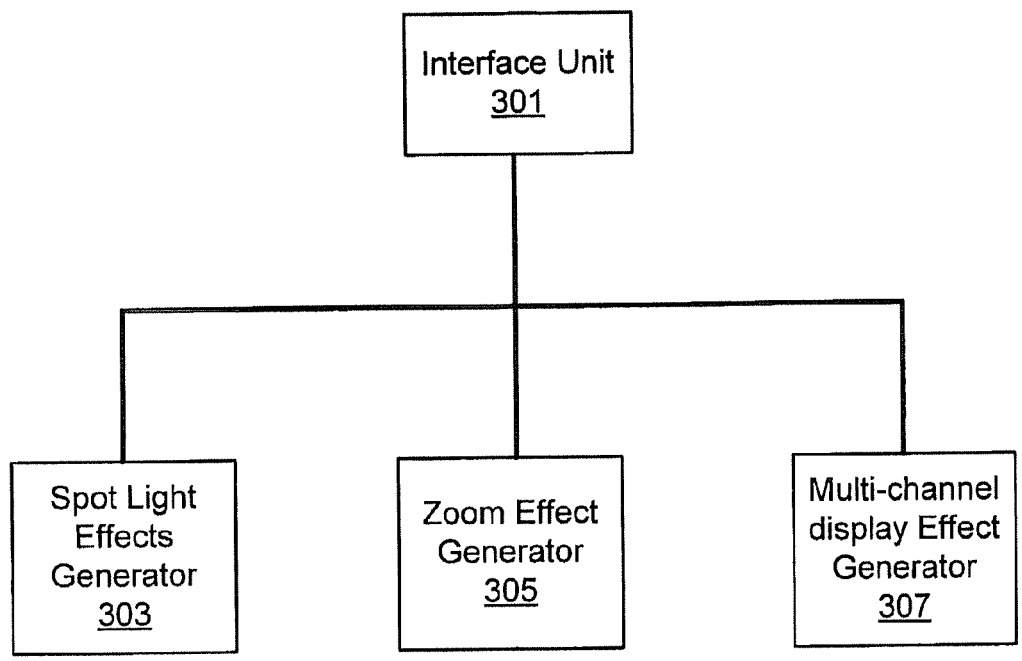
FIG. 4 is a block diagram illustrating an embodiment of a special effects generation unit.

FIG. 4 is a block diagram illustrating an embodiment of a special effects generation unit 211 that produces spotlight, zoom, multi-channel display, and other effects. The special effects generation unit 211 includes an interface unit 301 and, various special effects generators such as the spotlight effects 303, zoom effects 305, multi-channel display effects 307, etc. The interface unit 301 provides the glue logic to interconnect and control various special effect modules like the spotlight effects 303, etc. to the controller 209 in the special effects processor 103. The processed data from the selected special effects generators 303, 305, 307, etc. is sent out to the mixing unit 207 in the special effects processor 103, while the interface unit 301 provides the corresponding handshake signals to the controller 209 in the special effects processor 103.

The spotlight effect implemented by the special effects generation unit 211 requires identifying or creating a region of interest using input controls 209 and applying filters on the luminance and color components such as YU, Y,CbCr or RGB depending upon the content of video sources 105, 117 received via Video Source Interface 205.

One or more spotlights of various shapes, sizes, colors, brightness etc. can be created. The direction of moving spotlights can be programmed by the user using controls in the controller 209.

The user interactions mentioned above can be better understood by the example described below, where applying a tracking circular spotlight for each of the three actors' faces, each spotlight being in a different color is described. These spotlights were respectively allocated three different layers, layers 6 to 8. The regions of interest mentioned earlier may be correlated to the three actors' faces, which need to be spotlighted. The spotlights and other effects described here are applied in real time during a live broadcast in the studios.

A user uses function keys of a Keyboard 109 to activate different special effects menu displaying the menu on the Display Unit 113. For instance, pressing the key "F1" once activates the spotlight effect menu, displaying at the bottom all the options such as "Tracking", "Fixed", "Moving", "Circle/ellipse", "Diamond", "Hearts", etc. Using a mouse, the user can click on the circle menu to activate it, position it and change its size in the same way we create a circle/ellipse in the word document. The circle is positioned by drag and drop and sized by pulling the handles to cover the first actor's face using the mouse. This also opens a sub menu (at the bottom of the display) for color choice and associated layer numbers. The user clicks on the desired color and layers. Pressing "ESC" key takes the menu backwards. The associated layers are layer 1 for first actor, layer 6 for locating the tracking circular light of desired color for first actor. Similarly, for other actors and their corresponding spotlights.

For faster application, keys can be directly pressed, where applicable. The key sequence: F1 C B 1 6 activates a spotlight of shape circle, color blue on the first actor in layer 1 stored in layer 6. Using the mouse, the created spotlight is positioned and sized on the first actor's face. Pressing the key "T" sets the spotlight as tracking type and activates it immediately. Thereafter, wherever the first actor's face moves, the spotlight tracks it immediately. Still faster way to apply the spotlight is to assign the above sequence to one of the function keys, F1 to F12. Pressing "CTRL"+F1 stores the last sequence keyed in, namely, F1 C B 1 6 T to "F1" key. Pressing "CTRL"+F1 again activates the same sequence. Similarly, all other spotlights, for that matter any other special effects, can be applied. With little practice, the user can apply all these effects fast in real time. Using a plurality of remote mouse units, keyboards or PC Tablets, users can apply several effects simultaneously.

Figure 5:
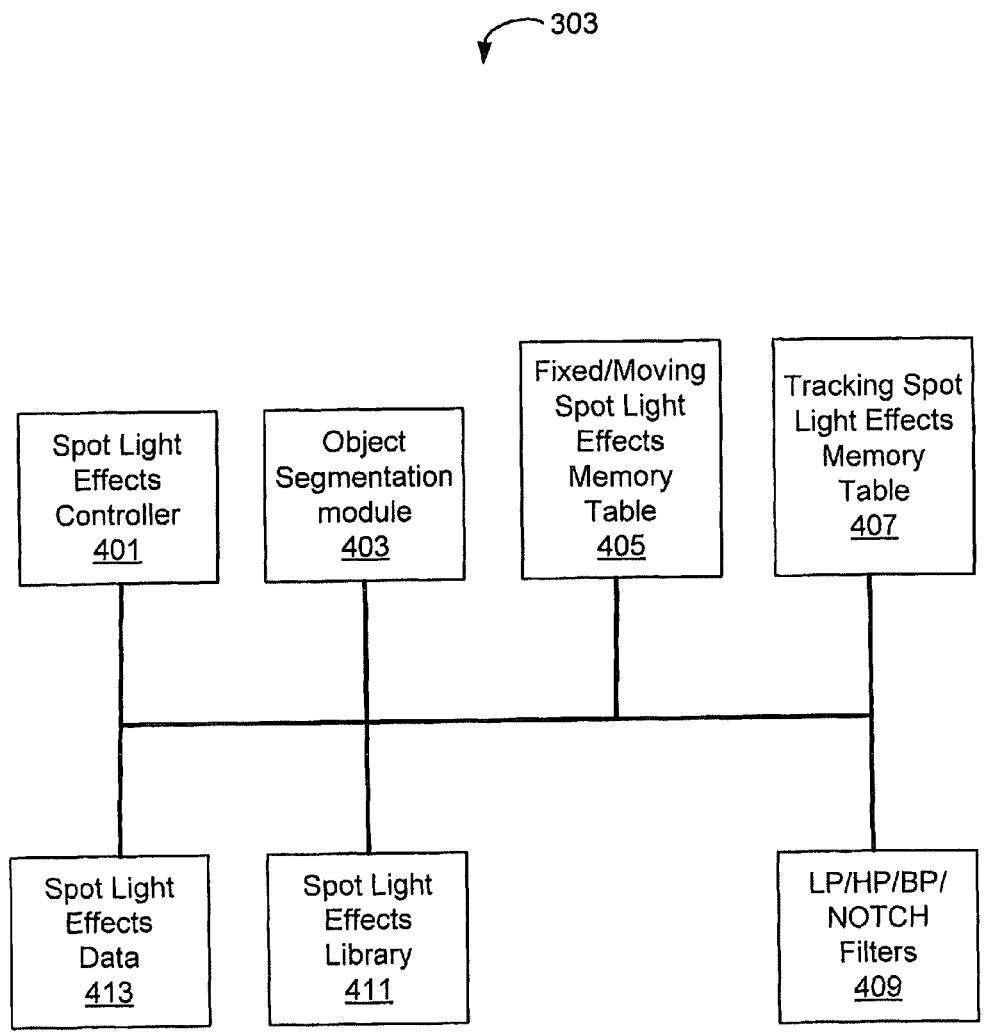
FIG. 5 is a block diagram illustrating an embodiment of a spotlight effects generator in accordance with the present invention.

FIG. 5 is a block diagram illustrating an embodiment of a spotlight effects generator 303 built in accordance to an exemplary embodiment of the present invention. The spotlight effects generator 303 includes a local (spotlight effects) controller 401, an object segmentation module 403 that creates video layers from a non-layered video source 105, a memory table for storing details of fixed and moving spotlights 405, a memory table for tracking spotlights 407, a bank of filters 409, a library of spotlight effects 411 and, a data interface 413.

The local controller 401 and the object segmentation module 403 communicate with the interface unit 301. The interface unit 301 in turn communicates with the controller 209 in the special effects processor 103, so that user selection of various spotlights is processed by the spotlight effects generator 303. User selections of various spotlights are input using a mouse 107, a key board 109 or a PC tablet 111.

An object segmentation module 403 brings about the separation of various objects or persons from the rest of the frame in a moving picture provided by a video source 105 in the video effects creation system 101. This module 403 has built-in memory for storing the separated objects as video layers. A module of memory table is used for storing various parameters of fixed and moving spotlights 405. Likewise, another memory table is used for storing the parameters associated with the tracking spotlights 407.

A bank of filters 409 uses different types of filters such as the low pass, the high pass, the band pass, the notch or the band reject, etc., implemented using multi-tap finite impulse response (FIR) digital filters. A built-in library of spotlight effects 411 is also available in the system to store the key sequence of effects, with a provision to add more number of such effects by the user. A data interface module 413 communicates the entire processed spotlight effects data used by various modules mentioned earlier to the mixing unit 207 in the special effects processor 103.

There are at least two options available while applying spotlight effects: applying varying luminance and chrominance values and the other is active tracking of it. The user can apply one or more spotlights that are fixed spatially. Bright or dim controls or various colors are applied to them. Specific spotlights can be switched on or off. User decides which spotlights he or she wants to track and applies appropriate controls to activate these features.

A standard wired mouse, a wireless mouse, a remote control or a PC tablet can be used to select any part of a picture or identify ROIs for introducing spotlight effects. One can have spotlights going up or down or in different directions with different speeds in accordance with the user settings. User controlled spotlights or fixed spotlights can be part of the picture itself or independent of the picture in separate video layers.

Spotlight effects can be manually controlled or specified as ROIs at the time of editing, be it in the broadcasting studios or at the users end. ROI need not be a rectangle; it can be of any other shape and size. Spotlights can be single or multiple, static or dynamic, non-tracking or tracking types.

The basic principle of creation of spotlight effects is to identify the ROI and apply various luminance and color components such as YUV or YCbCr or raw image data, RGB to enhance or highlight a selected part of a scene. In order to perform this operation, filters are applied to the luminance and/or chrominance components. Different kinds of filters followed by appropriate scaling operations are applied, thereby creating various color effects or various brightness effect or dimming effect.

The filters employed for producing spotlight effects are typically multi-tap digital FIR filters configured as low pass, high pass, band pass, notch filters, etc. Applying these filters on luminance and chrominance components of image pixels is usually better than applying on raw RGB since luminance and chrominance components can be independently manipulated. The invention, however, allows the spotlight effects to be applied either to luminance/chrominance or on the raw picture (RGB) format.

Spotlights are transmitted in different layers. A selective filtering followed by scaling is applied on the selected ROI, wherein scaling is the application of multipliers. Scaling can be up or down, depending upon the actual requirements, namely, enhance or dim the spotlights as desired by the user. Different multiplication factors are used to scale the intensity or color values of pixels in a ROI. Multi-tap filters are applied on pixels along both the horizontal and vertical directions in a ROI. Filters are used to create a smoothening or averaging effect and scaling to increase or decrease pixel intensities.

Linear filters are used to filter and scale different components of the ROIs in a picture. They can be intensity, chroma values, contrast, hue or saturation. All these can be applied using software, but they are not in real time, whereas the invention is dynamic and applied on-line.

In one embodiment, during the broadcast of a live sports programming such as a soccer match, for example, the main player can be tracked by a spotlight, where the live TV broadcast is taken as input to the video source 105. Attention of a user is more focused on the person or item being shown under the spotlight that is generated by the special effects generation unit 211, i.e., the user's attention does not get divided when a spotlight is turned on, as it does without it.

Active tracking of a spotlight or multiple spotlights is/are provided by the special effects generation unit 211. One or more fixed spotlights can also be created when necessary by the special effects generation unit 211. Tracking effect is invoked after the region of interest is identified employing appropriate input controls in the controller 209. A mouse 107 or a remote control based version of that or a keyboard 109 or a PC tablet 111 attached to the controls 209 can be used to identify or define the region of interest. The object segmentation module 403 brings about the separation of various objects or persons from the rest of the frame in a moving picture provided by a video source 105 in the video effects creation system 101. Each of the separated objects is reckoned as a separate layer.

A memory table 405 is used for storing various parameters of fixed and moving spotlights. Likewise, another memory table 407 is used for storing the parameters associated with the tracking spotlights. Some of these information are layer number of the spotlight and the corresponding shape such as a circle, heart, etc., color, fixed or moving or tracking, current position on the display screen, speed and direction of travel, whether the specific spotlight is on or off, etc. These specifications are selected by the user using appropriate input controls, where applicable and, are used dynamically while the actual spotlights are applied subsequently by a specified method.

In one embodiment, a spotlight is incorporated at the time of video editing of a program, the video program being provided as input to the video source 105. In another embodiment, the spotlight is identified and incorporated at broadcast time and, the live broadcast or the recorded program is input to the video source 105 and the special effects generation unit 211, which processes it to provide the necessary spotlight effect in the selected regions of interest, the selection being made via the input controls in the controller 209. In addition, multiple spotlights can be created and displayed, whether specified dynamically during a broadcast or pre-specified during an editing session and incorporated during broadcasting. A built-in library of spotlight effects is also available in the system, with a provision to add more number of such effects by the user. This library facilitates a fast application of a variety of spotlight effects by the user on-line.

An editing session of video data may be used to specify spotlights and other special effects. Thereafter, the actual spotlight or other effect is incorporated during viewing of the video data, if a user has enabled the spotlight effect. The spotlight effect may also be defined as meta information that is broadcast with actual original video data, which is then combined just before viewing on a display unit such as a TV. For example, a broadcast studio transmits the spotlight effects as separate layers of video data after they have been created using the video effects creation system 101. The spotlight effects as separate layers of video data are processed by an effects aware TV or other similar display devices capable of showing the special effects such as spotlights. User can switch spotlight effects (and also other special effects) on or off. Pre-selected regions of interest can, thus, be specified during video data editing using the video effects creation system 101 and such effects may be re-created at run-time based on user preferences, provided the necessary information for spotlight effects are also broadcast.

During editing session, the user interactions for application of spotlights or other effects are exactly like their applications during a live broadcast covered in paragraphs 68 to 70. However, in editing session, the user can take one's own time to set up effects and repeat the video sequence any number of times, thereby achieve more perfection in editing them.

Figure 6:
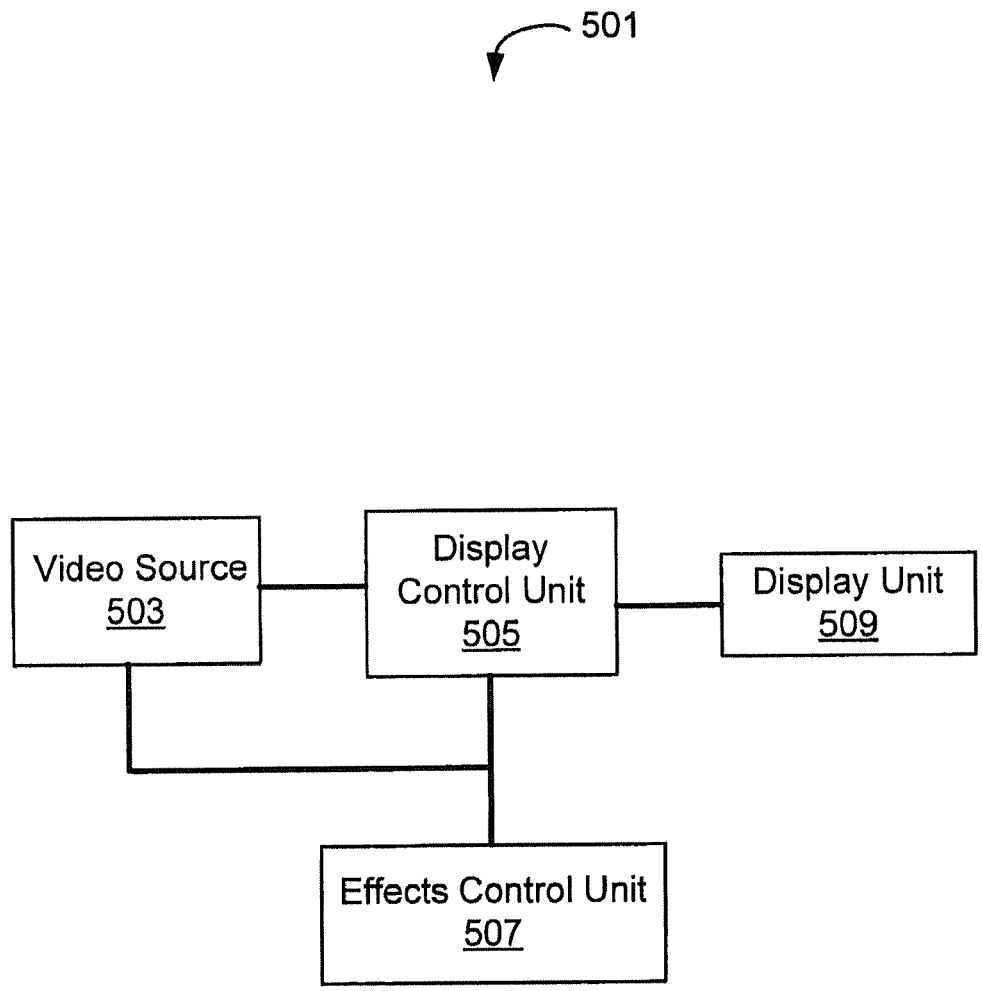
FIG. 6 is a block diagram of an effects aware video display system in accordance to an exemplary embodiment of the present invention.

FIG. 6 is a block diagram of an effects aware video display system 501 that receives video data, such as live TV broadcasts with special effects, on a video source unit 503 and displays them on a display unit 509. The effects aware video display system 501 employs the effects control unit 507 to determine if special effects, such as spotlights, should be enabled or disabled by the user or by other entities such as a broadcast network. The effects aware video display system 501 comprises the video source unit 503; the effects control unit 507, a display control unit 505 and a display unit 509.

TV Broadcast programs received by the effects aware video display system 501 at the video source 503 are optionally provided with special effects, which the effects control unit 507 processes and incorporates the special effects such as the spotlight effects, before the received video data is displayed on the display unit 509. The display unit 509 displays the video data with the special effects comprising spotlight effects, etc., if the user has enabled the effects control. Otherwise, the normal video sequence without special effects is displayed.

Cable operators or the users can also introduce the spotlights. They can be created in local consumer box, for example, a set top box. Spotlight effects. can be broadcast from the studios and allows the user to switch on or switch off the spotlight effects at will.

Figure 7:
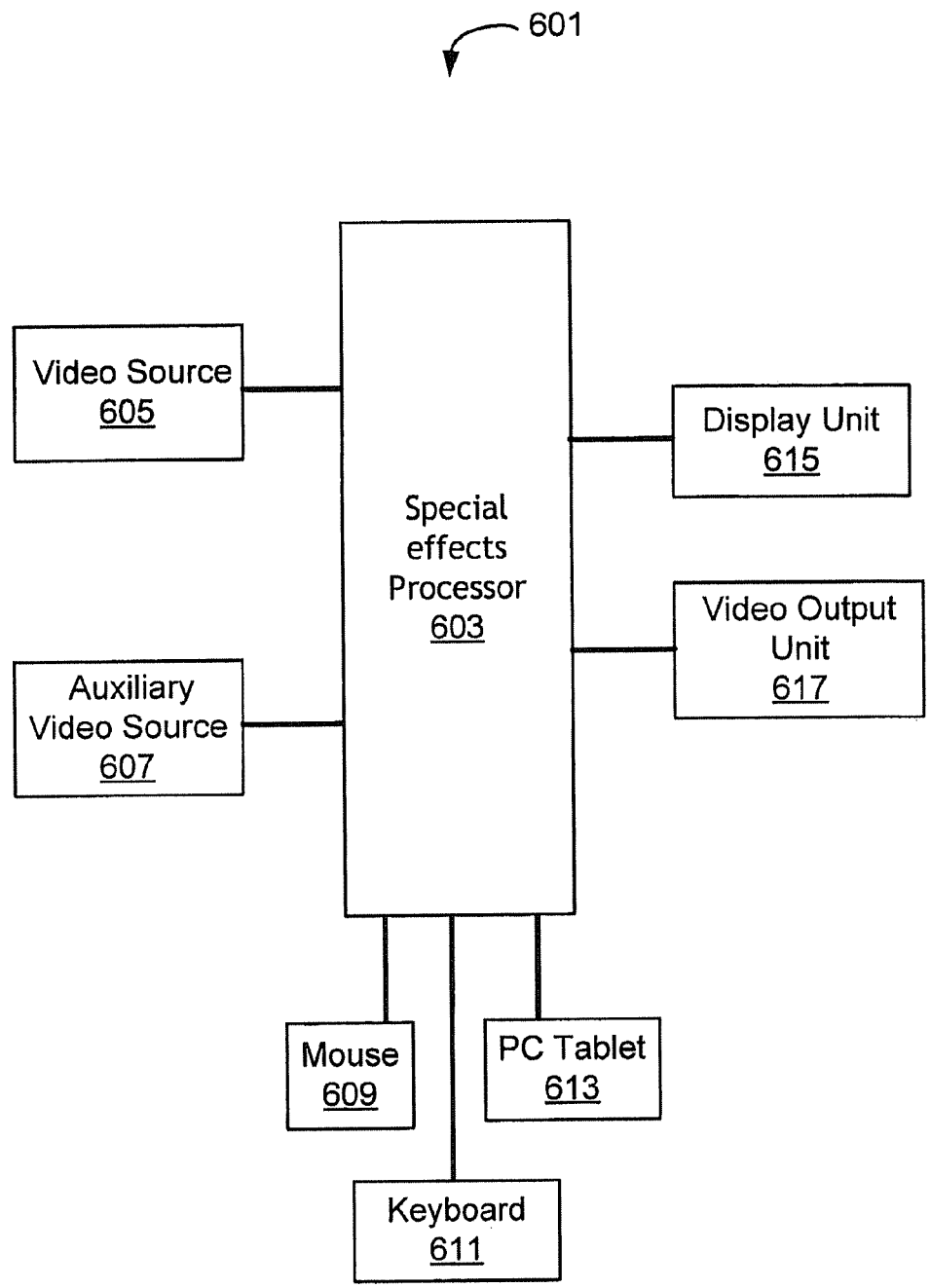
FIG. 7 is a diagram illustrating an exemplary embodiment of a video effects creation system in accordance to an exemplary embodiment of the present invention.

FIG. 7 is a diagram illustrating an embodiment of a video effects creation system 101, wherein at least a portion thereof is incorporated into a set-top-box in accordance with the present invention. The set-top-box 601 includes a video source 605, which receives a non-layered video, an auxiliary video source 607 that locally supplies video sequence in separate video layers, a special effects processor 603 that generates spotlight effects, etc., a display unit 615 for displaying the processed video and a video output unit 617 transmitting the processed video in layers or in composite form as per user selection. User provides the specification of spotlight effects, etc. using a mouse 609: wired or wireless, a keyboard 611, and a PC tablet 613. The video source 605 can be the video output 115 of the video effects creation system 101, if configured in non-layered mode. The set-top-box 601 is similar to the video effects creation system 101 described earlier.

Figure 8:
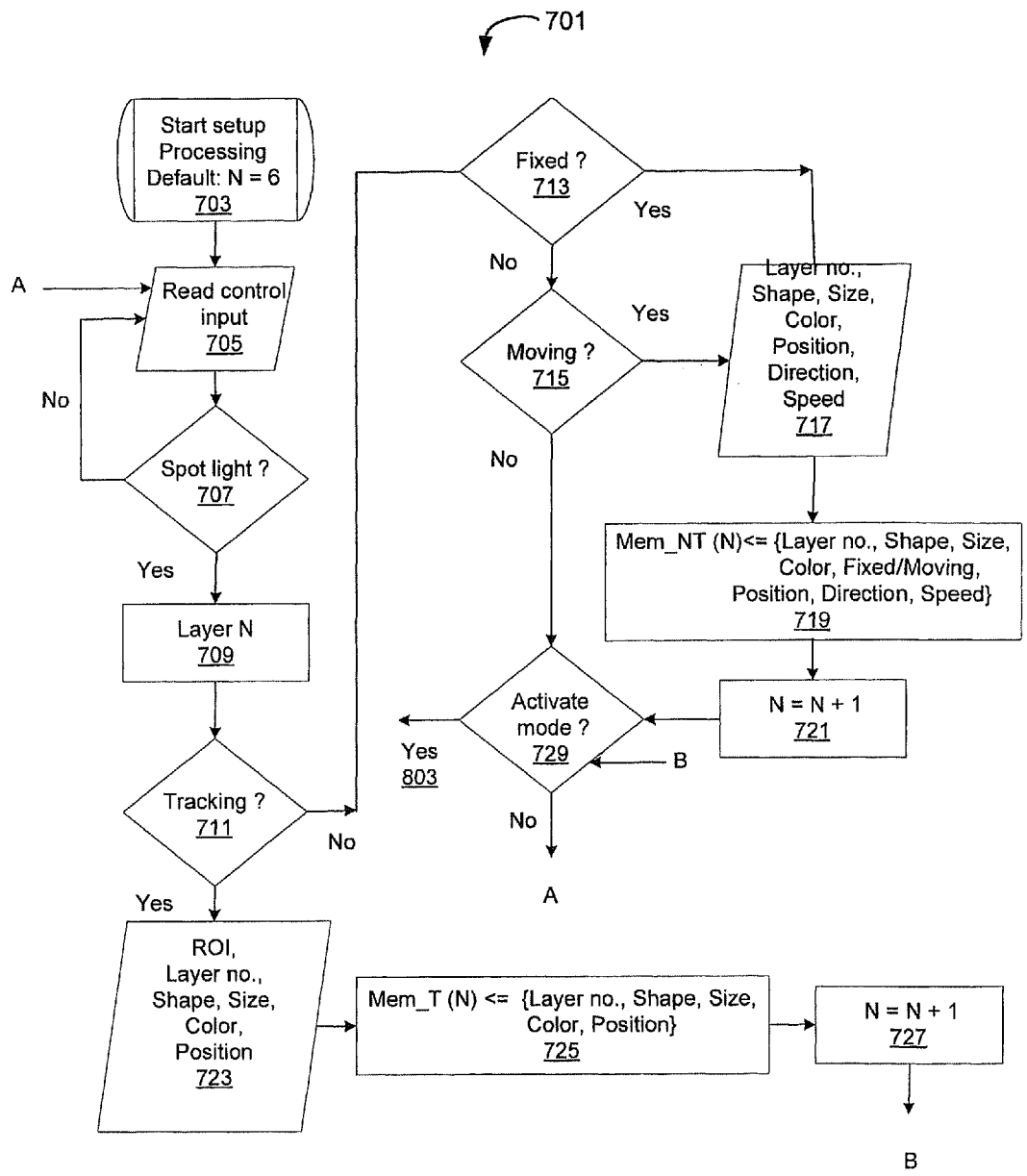
FIG. 8 is a flow diagram that illustrates an exemplary method of establishing a spotlight effect in accordance with the present invention.

FIG. 8 is a flow diagram that illustrates an exemplary method of establishing a spotlight effect in accordance with the present invention. A mouse 107, a keyboard 109 or a PC tablet 111 connected to the controls 209, inputs spotlight layer number selection 703, say, N=6 to mean layer 6, assuming that layers 1 to 4 are allotted to the objects and the background scene respectively, separated from a non layered video source 105 and, layer 5 to an auxiliary video source 117. In the next step 705, the control input is read. If the user selects the spotlight effect 707, then layer N (=6 in this case) 709 is selected for the present spotlight application.

If the tracking spotlight 711 is selected, then the invention permits the user to select any area or region of interest in step 723 in a video layer, layer number on which the spotlight is to be applied, shape of the spotlight (circle, heart, diamond, etc.), size, its color and position on the display. These inputs are menu driven. Using a mouse and dragging the shape in or out as per user's choice can change size. All these information are stored in Mem_T (N) 725 reserved for tracking type spotlight. For each spotlight layer, a separate memory location is used.

In the next step 727, the layer number is advanced to aid the setup of the next spotlight by reading the input control 705 again. If, instead of the tracking type, the user selects fixed 713 or moving 715 spotlight, layer (number) on which the spotlight is to be applied, its shape, size, color, position, direction and speed are input 717 by the user. All this information is stored in Mem_NT (N) in step 719 reserved for non-tracking type spotlight such as the fixed and moving types. After the layer number N is advanced in step 721, the control branches to read the input control in step 705 again. A function key toggles between the two modes 729: the set spotlight mode and the activate mode.

Figure 9:
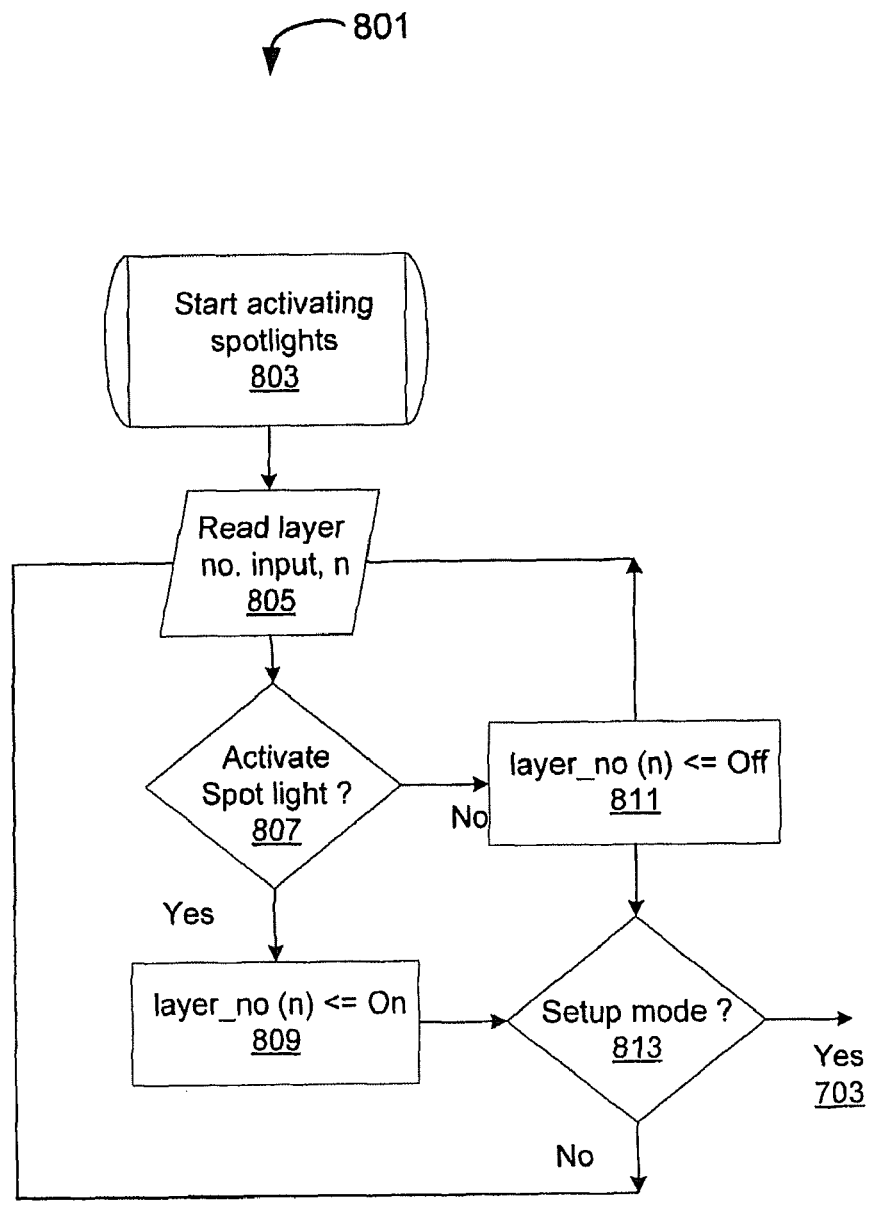
FIG. 9 is a flow diagram illustrating one method of activating spotlights in accordance to an exemplary embodiment of the present invention.

FIG. 9 is a flow diagram illustrating one method 801 of activating spotlights 801 in accordance with the present invention. The spotlights that were setup earlier are next activated in step 803 as per the method 801. A mouse 107, a keyboard 109 or a PC tablet 111 connected to the controls 209, inputs spotlight layer number 'n' in step 805 in this mode. The user can switch on or switch off in step 807 the layer numbered 'n'. If switched on, then the same information is stored in layer_no (n) memory 809 and the system awaits a fresh layer number 'n' to be selected by the user. Otherwise, the layer n is deactivated in step 811 disabling the spotlight and, the system waits for a fresh layer number. A function key toggles between the two modes in step 813: the set spotlight mode and the activate mode. All information of various layers is available by pressing a dedicated function key.

Effects are applied to layered and non-layered video streams to form layered and combined video output stream. Video outputs also deliver effect parameters such as regions of interest locations along with a video stream. Such effect parameters assist in the downstream application of dynamic effects. The video output does not send the actual effect layer itself, but instead, sends parameters detailing how to apply the effect. For example, the parameter is a (x,y) location of the center of a moving region of interest and possibly another changing parameter identifying the current minimum size of a spotlight to capture the entire region of interest. Downstream, at the Television, Set Top Box, etc., such parameters are used to create and apply the effect.

Figure 10:
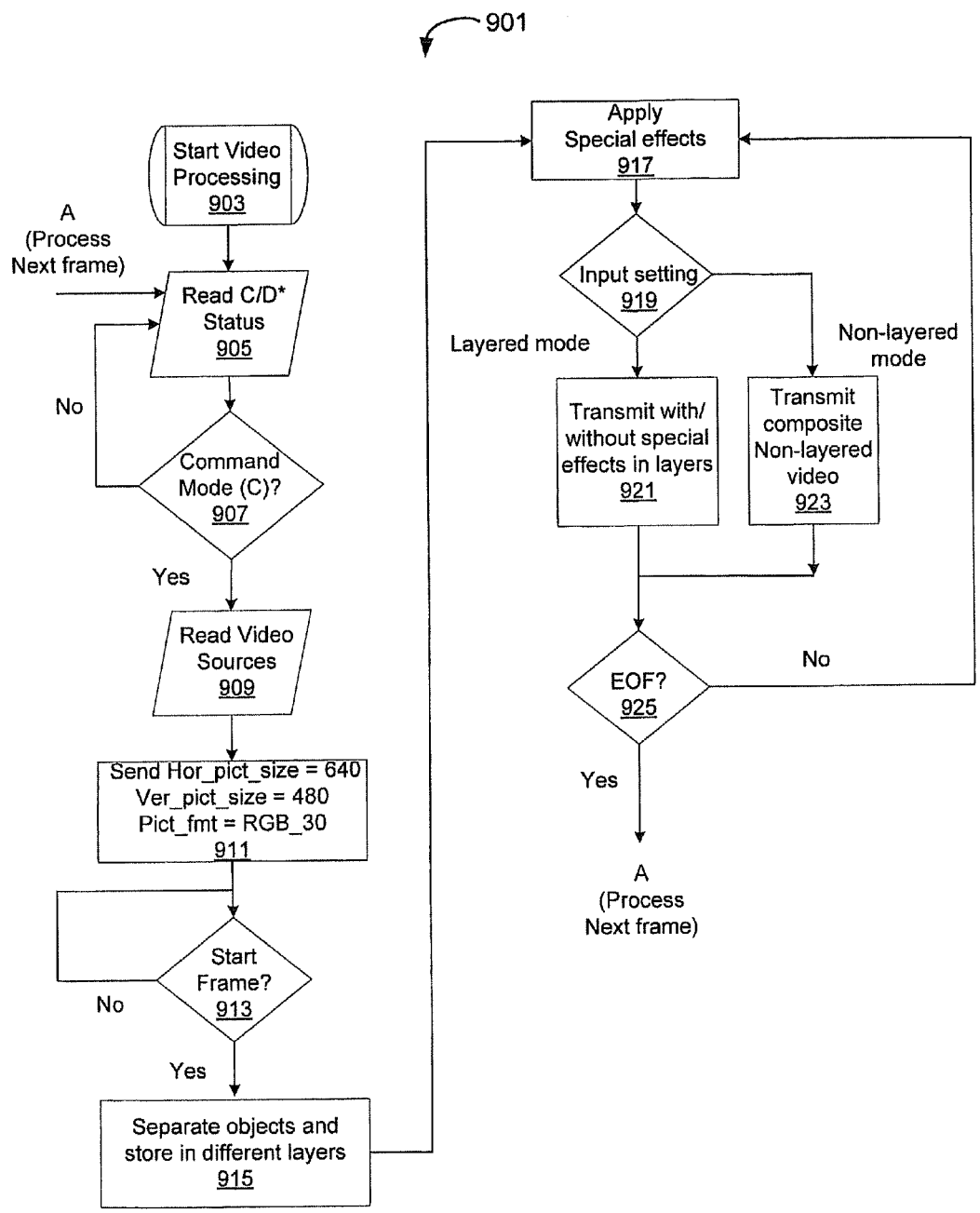
FIG. 10 is a diagram illustrating a protocol for communication among video source, auxiliary video source, the spotlight effects processor and the video outputs according to an exemplary embodiment of the present invention.

FIG. 10 is a diagram illustrating a protocol for communication 901 among video source 105, auxiliary video source 117, the spotlight effects processor 103 and the video output 115 according to one embodiment of the present invention. The Start Video Processing step 903 signals the commencement of data communication. When C/D* Status in step 905, is the command 'C' in step 907, the video sources are read concurrently at step 909. The two video sources are the non-layered video source 105 and the layered auxiliary video source 117 shown in FIG. 2. Otherwise, the special effects processor 103 waits for the command to be asserted.

With the command asserted, the picture size such as 640× 480 pixels, format such as RGB and frame rate, 30 frames/sec., for example, are transmitted in step 911 over the video output 115. Other picture sizes are also supported. Color formats include RGB, YCbCr or YUV in any one of the formats, 4:4:4 or 4:2:2 or 4:2:1 or 4:2:0. The frame rate is 30 frames per second although any other frame rate such as 25 can be set. Any upcoming new standard formats can be easily upgraded. The start of frame command in step 913 is awaited. When the command is received, separation of objects is carried out by object segmentation modules 403 and stored as different layers 915.

In the next step 917, the special effects are applied as explained earlier. Using a mouse 107, a keyboard 109 or a PC tablet 111 connected to the controls 209, the user can select what he/she wants 919, namely the composite non-layered video or the layered video with or without special effects, to be transmitted over the video output 115. If the user selects layered special effects mode, then special effects are transmitted in layers in step 921. In this mode, provision exists to transmit all layers without special effects, if the user wants it that way. On the other hand, if the user selects the non-layered mode, then special effects are transmitted without layers 923. In this mode, the non-layered video source 105 can also be transmitted without any special effect as per user's settings. These video sequences can also be selectively displayed on the local display unit 113. If there are no more data to be sent, signifying the end of frame (EOF) 925, we repeat the process from reading the command 905 for processing the next frame.

According to another embodiment of the invention, the system will monitor use of the special effect and charge the user accordingly. According to an exemplary embodiment of the present invention, the use is monitored by use-based metering which will monitor the use of the spotlight effect. The metering is performed by a user meter which will monitor for example, how the special effect is used. Monitoring of the special effect allows the service provider to charge an end-user based upon how the special effect is used, and for how long the special effect is used.

In an exemplary embodiment, the use meter will detect the request for a special effect, monitor the type of special effect used, and the time that the special effect was in use by the end user. The time that the effect is in use may begin either when the special effect is transmitted, or in the case where the special effect is continuously transmitted, the time that the special effect is in use.

According to another exemplary embodiment, a use server is provided to implement the use meter. For example, a set top box (STB), as shown in FIG. 1 is configured, either by hardware or software, to monitor use of the special effect and to transmit a use report to the use server. The information stored in the use server, allows for appropriate or customized billing for use of the special effect.

According to this exemplary embodiment, the stored usage information is in the form of a user log as shown in FIG. 11. Thus, the user log 1100 represents use of the special effect by a particular end-user. The user log 1100 is configurable to correspond to a single STB or to multiple STBs for a particular user.

The user log 1100 entries may include for example, the type of special effect that was used, the time that use of the special effect began and the time that use of the special effect ended for the end-user. As shown in the example illustrated in FIG. 11, column 1 1115 contains an indication of the special effect that was used. A "1" for example indicates that a spotlight effect was used.

Column 2 1120 contains an entry for the date and time use of the special effect began. For example "03220610" indicates that use of the special effect began on March 22 at 6:10 a.m.

Likewise, column 3 1125 contains an entry for the date and time that use of the special effect ended. Thus, "03220714" indicates that use of the special effect ended on March 22 at 7:14 a.m.

As one of average skill in the art will appreciate, the term "communicatively coupled", as may be used herein, includes, but is not limited to, wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have also been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

We claim:

1. A video processing system, located at first and second premises, that operates on a first video having a single video layer, the video processing system comprising:
 a communication pathway;
 a video source, at the first premises, that is configured to broadcast the first video on the communication pathway;
 first circuitry, at the second premises, that is configured to receive the first video via the communication pathway;
 the first circuitry configured to convert the single video layer of the first video into a plurality of video layers, wherein one of the plurality of video layers of a scene omits at least one object present in another of the plurality of video layers of the scene; and
 second circuitry, at the second premises, that is configured to apply an effect to at least one of the plurality of video layers.

2. The video processing system of claim 1, wherein the effect applied by the second circuitry comprises a spotlight effect.

3. The video processing system of claim 2, wherein the second circuitry is configured to generate the spotlight effect based on a parameter.

4. The video processing system of claim 3, wherein the parameter determines a shape of the spotlight effect.

5. The video processing system of claim 3, wherein the parameter determines an appearance characteristic of the spotlight effect.

6. The video processing system of claim 3, further comprising a user interface that is configured to accept input comprising the parameter.

7. The video processing system of claim 2, wherein the second circuitry is configured to apply the spotlight effect dynamically by employing tracking.

8. The video processing system of claim 1, wherein:
 the first video comprises a video stream; and
 the first circuitry is configured to operate on the first video as it is received.

9. The video processing system of claim 1, wherein the second circuitry comprises:
 a generation unit that is configured to produce special effects; and a mixing unit that is configured to produce a combined output video.

10. The video processing system of claim 9, further comprising a display communicatively coupled to display the combined output video.

11. The video processing system of claim 1, wherein the second circuitry is configured to apply the effect to a region of interest.

12. The video processing system of claim 1, further comprising an accounting module.

13. The video processing system of claim 12, wherein the accounting module further includes a meter configured to monitor use of the effect and the accounting module is configured to charge a user based at least in part on the amount of time the effect is used.

14. The video processing system of claim 13, wherein the accounting module is configured to charge the user based at least in part on the type of effect.

15. Video processing circuitry comprising:
a video input that is configured to receive a first, single layer of video;
a layering module, communicatively coupled to the video input, that is configured to convert the first, single layer of video to a plurality of layers of video, wherein one of the plurality of video layers of a scene omits at least one object present in another of the plurality of video layers of the scene; and
an effects processing unit that is configured to apply a video effect to one or more of the plurality of layers of video to create processed layers.

16. The video processing circuitry of claim 15, wherein the video effect comprises a spotlight effect.

17. The video processing circuitry of claim 15, further comprising a combining module that is configured to create a second, single layer of video using the processed layers.

18. The video processing circuitry of claim 15, further comprising a user interface through which the effects processing unit can be controlled.

19. The video processing circuitry of claim 15, further comprising an accounting module.

20. The video processing circuitry of claim 19, wherein the accounting module further includes a meter configured to monitor use of the video effect and wherein the accounting module is configured to charge a user based at least in part on the amount of time the video effect is used.

21. The video processing circuitry of claim 20, wherein the accounting module is configured to charge the user based at least in part on the type of effect.

22. A method of processing first video having a single layer, the method comprising:
converting the single layer of the first video to a plurality of layers, wherein one layer of the plurality of layers of a scene omits at least one object present in another layer of the plurality of layers of the scene;
applying an effect to one or more of the plurality of layers to produce processed layers; and
generating a second video having a single layer based on at least the processed layers.

23. The method of claim 22, wherein the application of the effect is based on a parameter.

24. The method of claim 23, further comprising receiving the parameter via a user input.

25. The method of claim 23, wherein the parameter comprises region of interest information.

26. The method of claim 25, wherein the region of interest information comprises tracking information.

27. The method of claim 22, further comprising monitoring use of the effect and billing a user based at least in part on the amount of time the effect is used.

28. The method of claim 27, wherein the monitoring use of the effect further includes charging the user based at least in part on the type of effect.

29. A method of applying a video effect, the method comprising:
receiving a primary video stream;
creating a plurality of video layers from the primary video stream, wherein one of the plurality of video layers of a scene omits at least one object present in another of the plurality of video layers of the scene;
receiving at least one effect parameter associated with the primary video stream;
receiving a user input; and
selectively applying the video effect to one or more of the plurality of video layers created from the primary video stream based on the user input.

30. The method of claim 29, wherein the application of the video effect is controlled by the user input.

31. The method of claim 29, wherein the at least one effect parameter comprises region of interest information.

32. The method of claim 29, further comprising:
receiving an effect video stream;
selectively combining the primary video stream and the effect video stream based on the user input; and
activating the combined primary and effect video streams.

33. The method of claim 32, wherein the application of the combination is controlled by the user input.

34. The method of claim 29, further comprising monitoring use of the video effect and billing a user based at least in part on the amount of time the video effect is used.

35. The method of claim 34, wherein the monitoring use of the video effect further includes charging the user based at least in part on the type of video effect.

* * * * *